United States Patent
Voss (10) Patent No.: US 6,720,525 B2
(45) Date of Patent: Apr. 13, 2004

(54) DEVICE FOR PERFORATING ROD-SHAPED ARTICLES, PARTICULARLY IN THE TOBACCO-PROCESSING INDUSTRY

(75) Inventor: Helmut Voss, Lockstedt (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 10/134,443

(22) Filed: Apr. 30, 2002

(65) Prior Publication Data

US 2002/0158050 A1 Oct. 31, 2002

(30) Foreign Application Priority Data

Apr. 30, 2001 (DE) .......................... 101 20 923
Dec. 7, 2001 (DE) .......................... 101 60 167

(51) Int. Cl.⁷ .......................... B23K 26/38; G02B 27/10
(52) U.S. Cl. ............... 219/121.7; 131/281; 219/121.77; 359/495
(58) Field of Search .......................... 219/121.7, 121.71, 219/121.77; 131/281; 389/495, 839

(56) References Cited

U.S. PATENT DOCUMENTS

| | | | | |
|---|---|---|---|---|
| 4,265,254 A | * | 5/1981 | Koch et al. | 131/281 |
| 5,060,668 A | * | 10/1991 | Weinhold | 131/281 |
| 5,684,617 A | * | 11/1997 | Langhans | 219/121.7 |
| 5,746,229 A | * | 5/1998 | Draghetti et al. | 131/281 |
| 5,786,560 A | * | 7/1998 | Tatah et al. | |
| 6,236,509 B1 | * | 5/2001 | Grandjean et al. | |
| 6,556,320 B1 | * | 4/2003 | Cao | |

FOREIGN PATENT DOCUMENTS

| | | |
|---|---|---|
| DE | 27 54 104 C2 | 6/1979 |
| DE | 195 11 393 A1 | 10/1996 |
| DE | 195 30 216 A1 | 5/1997 |
| EP | 674190 A1 * | 9/1995 |
| EP | 0 761 376 A1 | 3/1997 |
| EP | 1 018 392 A2 | 7/2000 |

* cited by examiner

*Primary Examiner*—Geoffrey S. Evans
(74) *Attorney, Agent, or Firm*—Venable LLP; Robert Kinberg (57) ABSTRACT

A device and a method for producing zones of desired air permeability in the enveloping material of rod-shaped articles, particularly in the tobacco-processing industry. The device includes a beam-guiding device for focusing an energy-rich beam, generated by a radiation source, onto the enveloping material in order to form perforation zones, as well as a multiple beam-generating device that generates a multiple beam from the single beam. The multiple beam-generating device is provided with at least one optical element that is fixed in its operating position relative to the beam.

26 Claims, 7 Drawing Sheets

DEVICE FOR PERFORATING ROD-SHAPED ARTICLES, PARTICULARLY IN THE TOBACCO-PROCESSING INDUSTRY

CROSS-REFERENCE TO RELATED APPLICATIONS

This application claims the priority of German Patent Applications Ser. Nos. 101 20 923.1, filed on Apr. 30, 2001 and 101 60 167.0, filed on Dec. 07, 2001. The disclosures of the above German priority applications and of each and every U.S. and foreign patent and patent application mentioned below are incorporated herein by reference.

BACKGROUND OF THE INVENTION

The present invention relates to a device for producing zones of desired air permeability in the enveloping material of rod-shaped articles, in particular rod-shaped articles in the tobacco-processing industry. The invention relates to a beam guiding arrangement for focussing an energy-rich beam produced by a radiation source onto the enveloping material to form a number of perforation zones, wherein the number of perforation zones corresponds to the number of partial beams. The invention furthermore relates to a multiple beam-generating device that generates a multiple beam from a single beam. The invention also relates to a beam divider, in particular for use in such a device, for dividing a beam generated by a radiation source into at least two partial beams. Finally, the invention relates to a method for producing zones of desired air permeability in the enveloping material of rod-shaped articles, particularly in the tobacco-processing industry. Such a method comprises the steps of focusing an energy-rich beam, produced by a radiation source, onto the enveloping material in order to form perforation zones and to generate a multiple beam from a single beam.

Rod-shaped articles in the tobacco-processing industry in this connection are understood to include all articles provided with a perforation during production or following production. Above all, this refers to filter cigarettes, but can also refer to other types of cigarettes, other rod-shaped smoking articles or filter rods. The enveloping material is understood to include tape used for enveloping tobacco ropes or filter ropes, covering paper tape or sheets and the like, which can be perforated in the form of a material web, ready-to-use sections or as enveloping material for the rod-shaped articles.

Perforating the enveloping material for cigarettes and other rod-shaped smoking articles creates a zone of desired air permeability, through which the smoker suctions in air from the side while smoking. As a result, the shares of nicotine and condensate in the smoke are influenced, which also affects the taste. A laser is preferably used for perforating the enveloping material. The radiation from this laser is guided via an optical beam-guiding device into the respective perforation zones where it inserts the desired holes into the enveloping material.

With the aid of the multiple beam-generating device, it is possible to generate double or multiple beams for producing at least two side-by-side arranged perforation tracks in one and the same perforation zone, wherein the perforation tracks jointly form a perforation pattern in the perforation zone. Through a corresponding guidance and modulation of the double or multiple beams, different perforation patterns can be created in dependence on the desired requirements. One advantage of forming the perforation patterns with several side-by-side arranged perforation tracks is that the desired perforation can be realized over a specified surface and with a specific lengthwise expansion.

German Patent document 195 30 216 A1 discloses a device of the aforementioned type that uses a single laser as the radiation source. The multiple beam-generating device of the known device consists of a beam divider and deflection mirrors, used to generate two beams from the single beam emitted by the radiation source. Modern cigarette machines initially produce double-length cigarettes, which are then cut into individual cigarettes. As a result, the covering paper tape that connects the tobacco rods with the filter segments, or the connected double-length cigarettes, must be perforated in two perforation zones, so that each individual cigarette is provided with a corresponding perforation zone. The double or multiple beams of the known device are therefore additionally divided into respectively two partial beams with the aid of the beam divider. The beam guiding arrangement of this known device is provided with at least one additional deflection mirror. Thus, the known device generates two beams, which are converged in the joint perforation zones to form respectively one multiple beam. In addition, the beam-guiding device requires a specific optical arrangement for focusing the beams in the perforation zones onto the side-by-side extending perforation tracks. It is important that the double or multiple beams are guided at a specific and rather acute angle onto the beam divider of the beam-guiding device, which requires an exact adjustment of the beam divider and the deflection mirrors for the multiple beam-generating device.

SUMMARY OF THE INVENTION

It is an object of the invention to provide a different device and a different method of the aforementioned type.

The above and other objects are achieved according to the invention by the provision of a device for producing zones of desired air permeability in the enveloping material of rod-shaped articles, comprising: a beam-guiding device for focusing a multiple beam generated from a single energy-rich beam originating from a radiation source onto the enveloping material in order to create perforation zones; and a multiple beam-generating device located for creating a multiple beam from the single energy-rich beam, the multiple beam-generating device comprising at least one optical element that is fixed relative to the single energy-rich beam in an operating position of the optical element.

Thus, the foregoing and other objects are solved according to the invention in that the multiple beam-generating device of a device of the aforementioned type is provided with at least one optical element that is fixed in its operating position, relative to the beam from the radiation source.

Optical elements of this type are available for generating the desired multiple beams. With the aid of the invention, it is possible to realize a simple multiple beam-generating device and, in the process, essentially omit all moving optical elements, and those optical elements susceptible to movement, as well as complex optical arrangements. The diffractive optical element can be arranged in the beam path, either before or after the beam-guiding device.

A diffractive optical element in particular is capable of generating the desired slightly diverging double or multiple beams from a single beam, preferably generated by a single source, without requiring additional separate optical elements that may have to be adjusted.

To be sure, the use of diffractive optical elements in a device of the aforementioned type is known from German Patent document 195 11 393 A1 and European Patent Application No. 0 761 376 A1. However, the diffractive optical elements for the known prior art devices are components of the beam-guiding device and are used in the beam-guiding device in particular as beam dividers for dividing the double and multiple beams existing therein. The multiple beam-generating devices of the known systems are composed of different optical elements and thus provide a different type of structural solution. The prior art does not provide a stimulus for using a diffractive optical element, in addition to or in place of the beam-guiding device, either in the multiple beam-generating device or in place of it for generating double or multiple beams before they enter the beam-guiding device. The invention therefore cannot suggest itself as a result of the prior art.

An optical grid is particularly suitable for use as diffractive optical element.

A different advantageous embodiment is provided with an optical element that generates a multiple beam with an even number of partial beams, which exit at an angle relative to each other. This embodiment is distinguished by an optical element designed so that a first partial beam of the multiple beam exits in the direction of or along the axis of the beam entering the optical element and that the additional partial beam(s) of the multiple beam exits (exit) the optical element at an angle to the direction or axis of the beam entering the optical element. This design makes use of the knowledge that a stray beam as a rule develops unavoidably in the direction of the beam path for the incident beam. With the present design, the stray beam is cleverly used to form the first partial beam itself, so that the stray beam no longer interferes, but is useful. The first partial beam that is essentially formed by the stray beam and exits the optical element in the direction of the beam path axis for the incident beam therefore is not diffracted and can be called a partial beam of zero diffraction order. The second partial beam can be called a partial beam of the first diffraction order and additional partial beams can, if applicable, be called partial beams of the $n^{th}$ diffraction order.

The optical element preferably generates a multiple beam with two partial beams that diverge at an angle to each other, wherein the optical element is designed such that the first partial beam of the multiple beam exits in the direction or along the axis of the beam entering the optical element and thus forms the partial beam with zero diffraction order. The second partial beam exits at an angle to the direction or the axis of the beam entering the optical element and thus forms the partial beam of the first diffraction order. For this, the optical element should advantageously be designed such that an additional partial beam that is mirror-symmetrical to the second partial beam, relative to the axis, is essentially suppressed. The additional partial beam that must be suppressed is a partial beam of the $1^{st}$ diffraction order. The additional partial beams of the $2^{nd}$ to the $n^{th}$ diffraction order can, if necessary, be suppressed in the same way.

The previously specified object is furthermore solved according to the invention in that for a method of the aforementioned type, the beam is fanned out in a diffractive optical element into an even number of partial beams that diverge at an angle to each other in order to form the multiple beam.

The optical element should be arranged such that it can be removed from the beam path. An arrangement of this type is advantageous for exchanging, for example, the optical element in view of different requirements. This embodiment is furthermore advantageous if it is desirable to insert a single perforation track into the perforation zone in place of several side-by-side extending perforation tracks. In that case, the optical element can be removed easily and is ineffective when swiveled out of the beam path. Finally, removing the optical element will also simplify the maintenance. The optical element preferably should be arranged such that it can be pivoted from the beam path. In the first position where it is pivoted into the beam path, the optical element effectively generates the double and multiple beams. In this first position, the optical element according to the invention is fixed relative to the beam path, meaning to the beam generated by the radiation source.

The beam-guiding device is normally installed inside a housing, which can also be called a beam-divider head. In a case of that type, it is advantageous if a holding element for holding the optical element is provided on or inside the housing. The optical element should preferably sit on the holding element, so that the optical element is supported by the holding element.

For the previously mentioned reasons, the holding element should be mounted on or in the housing such that it can be detached again.

The holding element should be arranged so as to be movable inside the housing and should be pre-stressed with a spring in the direction away from the housing. This embodiment is advantageous if the housing is flanged with the side that supports the holding element to a machine, since the holding element is then secured relative to such a machine through the pre-stressing.

Means for detecting the presence of the housing and/or the holding element can preferably be provided when arranged on a machine for producing rod-shaped articles. This arrangement has technological advantages for the production process.

The holding element for another embodiment that is particularly preferred at present is a tube through which the radiation is guided and which preferably has the optical element installed at the tube end that facing the beam-guiding device. For an easier handling, it should be possible to fit the tube into the housing.

The beam-guiding device should advantageously have optical focusing means, designed to generate converging beams and to focus these onto the perforation zones on the enveloping material.

Another embodiment, which is particularly preferred at present and for which the multiple beam-generating device forms a multiple beam from the single beam emitted by the radiation source, is provided with a beam divider that divides the multiple beam into at least two partial beams. The beam-guiding device focuses the partial beams from the beam divider onto the enveloping material for creating perforation zones, wherein the number of perforation zones corresponds to the number of partial beams. This embodiment distinguishes itself in that the multiple beam-generating device consists of a single optical element that is fixed in its operating position relative to the beam from the radiation source. A single optical element is thus provided for this embodiment, which is installed in the beam path in front of the beam-guiding device.

The optical element can also be arranged in the beam path in front of the beam divider. The optical element in that case should basically be arranged as close as possible to the beam divider, meaning at the shortest distance thereto, to avoid excessive divergence of the double or multiple beams generated by the optical element before they enter the beam divider. There, they are divided into one or several partial beams, are subsequently transmitted further by the beam-guiding device and are again converted to converging partial beams for focusing onto the perforation zones.

The optical element for this embodiment can alternatively also be integrated into the beam divider of the beam divider arrangement, thus making it possible to keep the required space as small as possible. The beam divider simultaneously can also form the optical element, so that only a single optical component can be provided, which combines the functions of beam divider and optical element. An integrated beam divider of this type otherwise forms a separate aspect of the invention.

A further alternative embodiment of the invention is provided with a beam divider arrangement that divides the energy-rich beam generated by the radiation source into at least two partial beams. For this, beam-guiding device focuses the partial beams onto the enveloping material in order to generated a number of partial beams corresponding to the number of perforation zones, wherein the multiple beam-generating device forms a multiple beam from each partial beam. The multiple beam-generating device of this embodiment is distinguished in that it has an optical element for each partial beam, which is fixed in its operating position relative to the respective partial beam, wherein the multiple beam-generating device is generally arranged in the beam path behind the beam divider arrangement. Since a separate optical element is provided for each partial beam, the multiple beam-generating device of this embodiment still has a number of optical elements that correspond to the number of partial beams.

BRIEF DESCRIPTION OF THE DRAWINGS

These and other features and advantages of the invention will be further understood from the following detailed description of the preferred embodiments with reference to the accompanying drawings.

FIG. 4 schematically shows the machine-side end of a tube with coding device, arranged in the first embodiment of a beam-divider head according to FIG. 3a.

FIG. 5 schematically shows a cross section of a fixed, diffractive optical element in a first embodiment (FIG. 5a) and a second embodiment (FIG. 5b).

FIG. 6 schematically shows an integrated optical component as a third embodiment, which combines the characteristics of a diffractive optical element with a beam divider, wherein FIG. 6a shows an enlarged detail of the component in the cross section.

DETAILED DESCRIPTION OF THE INVENTION

Figure 1:
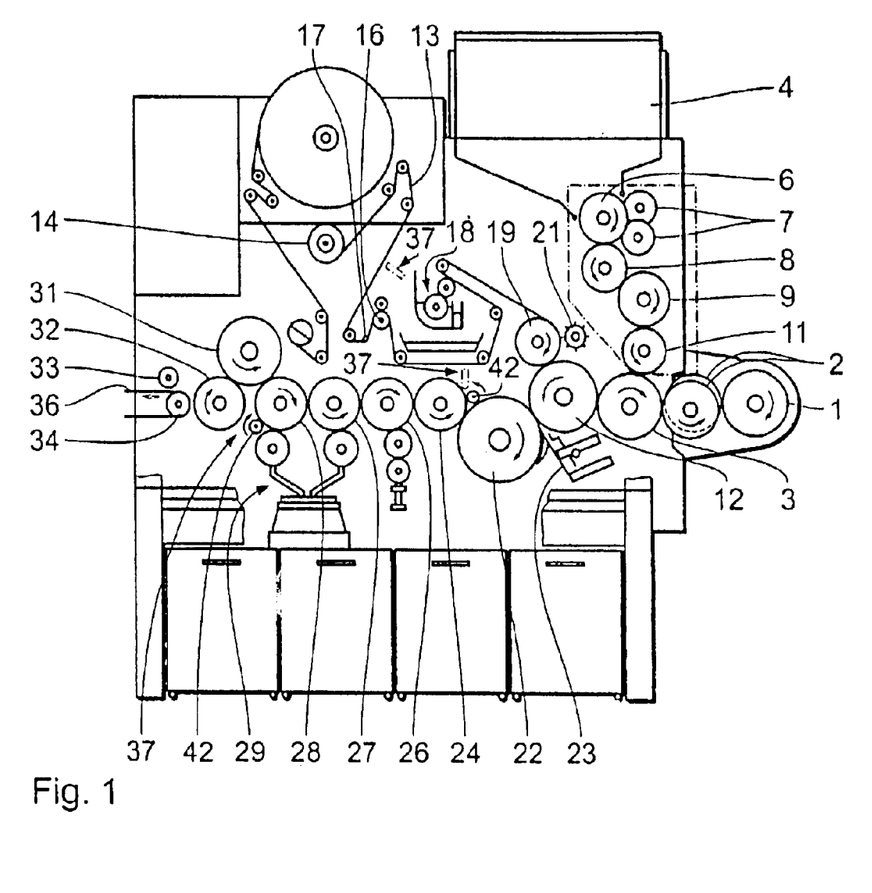
FIG. 1 shows a schematic representation of a known filter-attachment machine.

The filter-attachment machine according to FIG. 1 is known per se and is described only briefly in the following, with respect to design and mode of operation.

An intake drum 1 transfers the cigarettes produced on a cigarette-production machine to two staggering drums 2, which rearrange the cigarettes and move them in rows of respectively two items with an intermediate space between the cigarettes to an assembly drum 3. The filter rods travel from a magazine 4 to a cutting drum 6, are cut with two circular knifes 7 into filter plugs of double the usable length and are staggered on a staggering drum 8. With a pushing drum 9 they are aligned to form a row of successively arranged plugs and are deposited by an acceleration drum 11 into the intermediate spaces between the cigarette rows on the assembly drum 3.

The cigarette-filter-cigarette groups formed in this way are pushed together, so that they are fitted tightly against each other in an axial direction. Subsequently, they are taken over by a transfer drum 12. A covering paper tape 13 is pulled off a paper bobbin 14 with the aid of a feed device in form of a withdrawal roller 16. The covering paper tape 13 is guided around the sharp edge of a pre-breaker 17, is coated with glue from the glue spreader 18 and is cut on a deposit roller 19 with the aid of a knife drum 21. The cut sheets of covering paper are attached to the cigarette-filter groups on the transfer drum 12 and are rolled with the aid of a rolling hand 23 on a rolling drum 22 around the cigarette-filter groups.

The double-length filter cigarette groups, produced and completed in this way, are supplied via a drying drum 24 to a cutting drum 26 and are fashioned into individual filter cigarettes on this drum by cutting through the center of the filter plugs. At the same time, defective filter cigarettes are discarded. A turning device 29 that cooperates with a transfer drum 27 and a gathering drum 28 turns a filter cigarette row and simultaneously transfers it via the transfer drum 27 and the gathering drum 28 to the filter cigarette row passing through, which row is not turned. The filter cigarettes are moved via a test drum 31 to a rejection drum 32 where the filter cigarette heads are scanned prior to the discarding operation. A delivery drum 34, which operates jointly with a braking drum 33, deposits the filter cigarettes on a delivery belt 36.

The filter attachment machine includes a laser head 37 either in the region of the covering paper tape 13 or the region of a lateral conveyor. In the present case, it is assigned to the drying drum 24 or the gathering drum 28.

Figure 2:
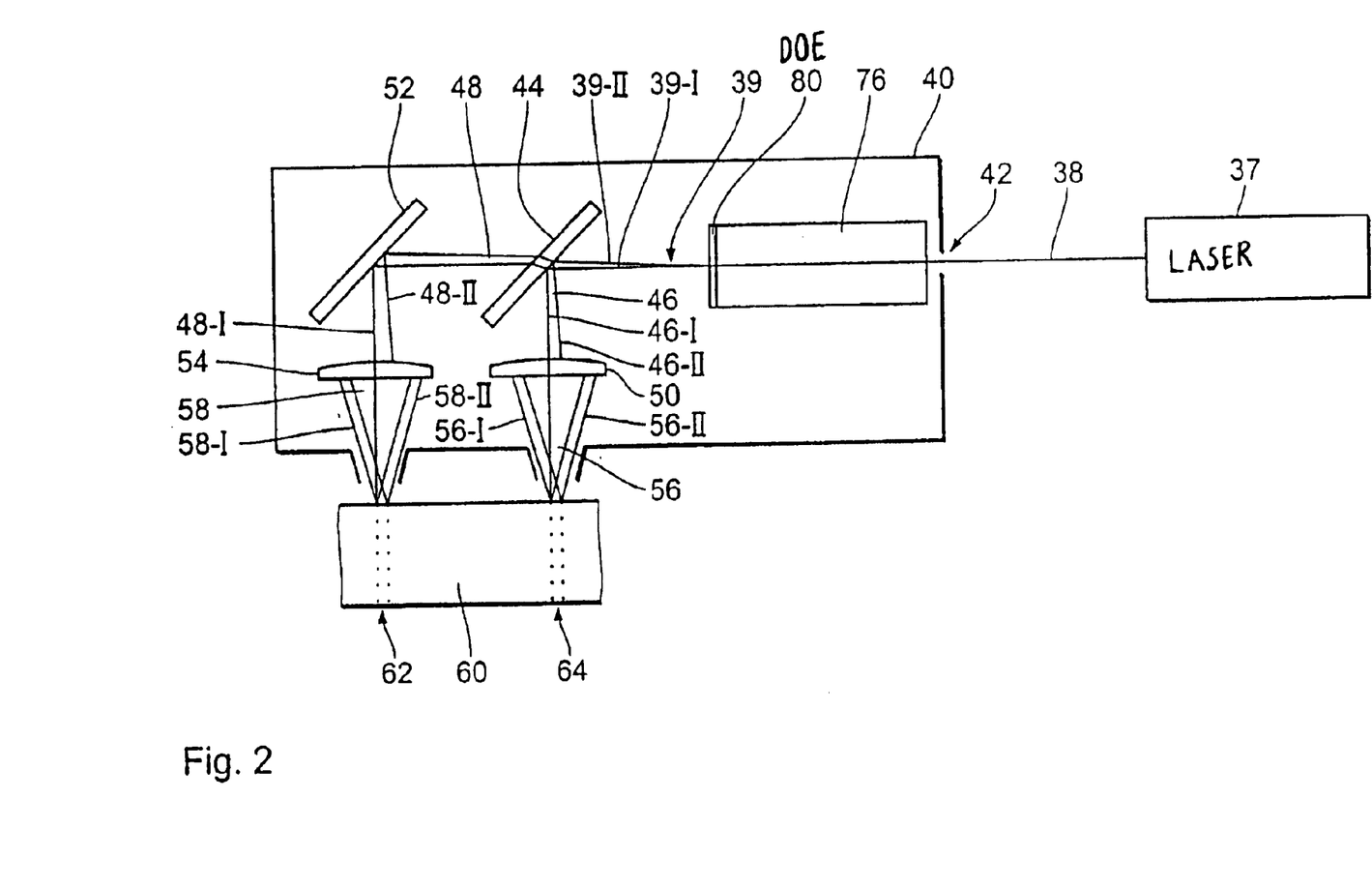
FIG. 2 shows a schematic representation of an embodiment of a perforation device according to the invention arranged in the filter-attachment machine shown in FIG. 1.

Referring to FIG. 2, there is shown the laser head 37 which is a component of an optical perforation device according to a preferred embodiment of the invention. Laser head 37 functions as a radiation source for generating and emitting a laser beam 38. The perforation device shown in FIG. 2 furthermore is provided with a housing 40 that forms a beam-divider head. The laser beam 38 enters the housing 40 through an opening 42 that is facing the laser head 37. Inside the housing 40, the laser beam hits a beam divider 44 arranged therein, which divides the laser beam 38 into a first beam 46 and a second beam 48. For the exemplary embodiment shown, the beam divider 44 consists of a semi-permeable mirror that reflects the first beam 46 and allows the second beam 48 to pass through. While the reflected first beam 46 is guided to a first beam head 50, the transmitted second beam 48 is directed toward a deflection mirror 52, which deflects the second beam 48 in the direction of a second beam head 54, so that the second beam 48 extends at a distance and parallel to the first beam 46. The beam heads 50 and 54 have corresponding optics for generating corresponding converging first and second beams 56 and 58 from the first and second beams 46 and 48, which are focused onto the perforation zones 62 and 64 on a covering paper section 60.

The covering paper section 60 shown in FIG. 2 represents either a portion of a covering paper tape 13 (see FIG. 1) or a section of enveloping material for an already produced double-length cigarette. As previously mentioned, double-length cigarettes of this type are produced during the manufacturing process by inserting a double-length filter segment between two axially aligned tobacco ropes and covering this group of tobacco rods and filter segment with a coating paper covered with glue. In order to perforate the enveloping material of a double-length cigarette produced in this way, the double-length cigarette is conveyed on a drum. In the case of the filter attachment machine shown in FIG. 1, they are conveyed on the drying drum 24 or the gathering drum 28 to the focusing region for the two beam heads 50 and 54. By means of a counter-rolling surface, the double-length cigarettes are turned back by 360° in the focusing region of the beam heads 50 and 54, wherein they stand still with respect to the beam heads 50 and 54. In this way, the cigarettes are provided with ring-shaped perforation tracks or puncture rows in the perforation zones 62 and 64. A conveyor for the locally fixed rotation of the cigarettes is described and illustrated in detail, for example, in German Patent document DE 27 54 104 C2, and European Patent application No. 1 018 392 A1.

Figure 3A:
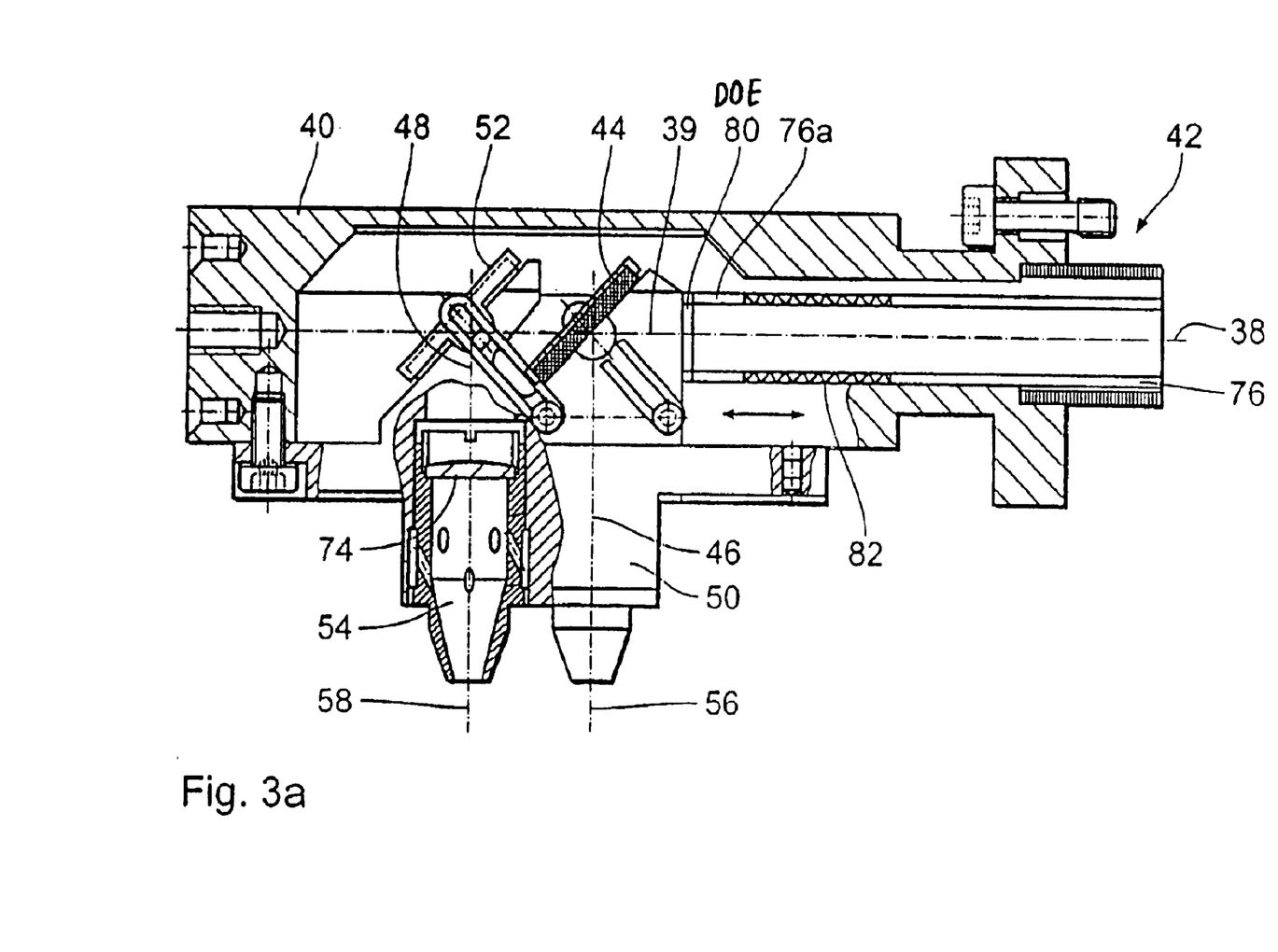
FIG. 3 shows a detailed, cross-sectional representation of a beam-divider head for the perforation device shown in FIG. 2, in a first embodiment (a) and a second embodiment (b).

The beam divider head of the perforation device in FIG. 2 is shown in further detail in a cross-sectional view of a first embodiment shown in FIG. 3a. In contrast to FIG. 2, FIG. 3a only shows the axes of the corresponding beams 38, 46, 48, 56 and 58. FIG. 3a shows that the previously mentioned beam divider 44 is positioned inside the housing 40 along with the also mentioned deflection mirror 52. The previously mentioned beam heads 50 and 54, arranged on the housing 40, are also shown in FIG. 3a. The beam heads 50 and 54 contain focusing optics, of which a lens 74 in the second beam head 54 is shown as an example in FIG. 3a.

A tube 76 is fitted into the opening 42 of housing 40 (compare also FIG. 2) that faces the laser head 37. This tube extends from the opening 42 until just before the beam divider 44. Accordingly, the housing 40 is provided with a hollow-cylindrical section that holds the tube 76. The tube 76 is arranged approximately coaxial to the axis of the beam 38 emitted by the laser head 37. Tube 76 has an end 76a that is adjacent to the beam divider 44 and which is provided with a diffractive optical element (DOE) 80 that generates a slightly diverging double or multiple beam 39 from the beam 38. FIG. 3a only shows the axis of this beam 39. FIG. 2 shows that the diffractive optical element 80 for the exemplary embodiment shown herein generates a double beam 39 from the beam 38 emitted by the laser head 37, which double beam consists of two partial beams 39-I and 39-II. The diffractive optical element 80, which is preferably designed as an optical grid, consequently acts as beam multiplexer.

The double beam 39 generated by the diffractive optical element 80 is subsequently divided by the beam divider 44 in the above-described manner and is correspondingly focused by the beam heads 50 and 54, as shown in FIG. 2. Corresponding to the partial beams 39-I and 39-II, the first beam 46 that is reflected by the beam divider 44 comprises two partial beams 46-I and 46-II and the associated converging beam 56 that is generated by the first beam head 50 consists of two partial beams 56-I and 56-II. The second beam 48 that penetrates the beam divider 44 consists of two partial beams 48-I and 48-II and the associated converging beam 58, generated by the second beam head 54, comprises two partial beams 58-I and 58-II.

With the aid of the double beam divided in this way, several side-by-side arranged rows with holes can be created in each perforation zone 62, 64 on the covering paper segment 60, wherein the exemplary embodiment shown in FIG. 2 has two side-by-side arranged rows of holes for each perforation zone 62, 64. The laser head 37 generates the pulsating laser beam 38 for inserting discrete holes into the perforation zones 62 and 64 (compare FIG. 2). By adjusting the pulse sequences, it is thus possible to have many different perforation patterns and, in particular, a differing division of the respective row of holes. In the process, a hole is simultaneously inserted in each row of holes in each of the two perforation zones 62, 64. Thus, a pair of holes is produced simultaneously in each perforation zone 62, 64, wherein respectively one hole is assigned to the one row of holes and the other hole to the other row of holes. The holes of the one pair are positioned on a line that extends parallel to the longitudinal or rotational axis of the cigarette or at an angle thereto, depending on the alignment of the diffractive optical element 80. The diffractive optical element 80 for the exemplary embodiment shown in FIG. 2 is adjusted such that hole pairs are simultaneously created, wherein both holes are offset relative to each other in the circumferential direction of the cigarette.

The tube 76 of the exemplary embodiment shown in FIG. 3a is fitted through the opening 42 and is pre-stressed by a spring 82 in the direction toward the opening 76. With its outer end, the tube rests against a machine, not shown in FIGS. 2 and 3, to which the housing 40 is flanged. The tube 76 can thus be secured relative to the machine. The machine in question is a filter-attachment machine, previously described with the aid of FIG. 1.

As previously mentioned, the tube 76 with the diffractive optical element 80 attached thereto is fitted into the housing 40 and is thus positioned detachable on the housing 40. The tube 76 and the diffractive optical element 80 attached thereto can thus be replaced easily or, if only one row of perforations is desired, can be omitted to prevent the creation of double or multiple beams.

Figure 3B:
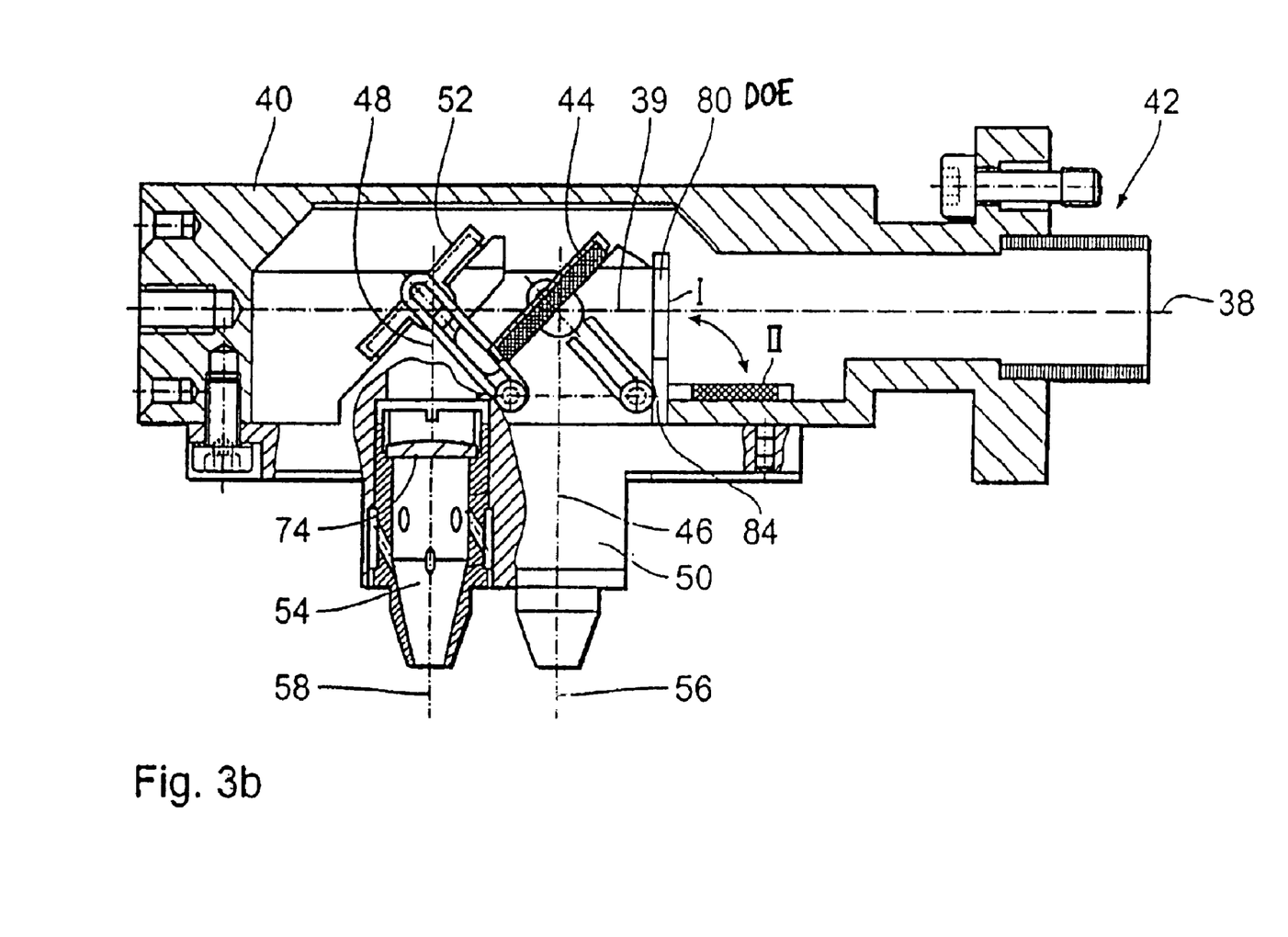

FIG. 3b shows a second embodiment of the optical arrangement housed inside the housing 40. This embodiment differs from the first embodiment in FIG. 3a in that the diffractive optical element 80 is not attached to a tube, which is missing here, but is secured via a joint 84 pivoting to the inside of housing 40. The diffractive optical element 80 can therefore be moved between a first position and a second position. In the first position, it is arranged in the beam path of beam 38, fixed relative to this beam, and generates the previously mentioned double or multiple beam, while in a second pivoted-away position, it is pivoted out of the beam path of beam 38 and is thus ineffective. In the latter position, it is not possible to form multiple row perforations.

The housing 40 shown in FIGS. 3a and 3b is preferably flanged onto a machine, as mentioned before, e.g. the filter-attachment machine previously described with the aid of FIG. 1. Suitable detection means can be used to detect the presence of the housing 40, which has process-technological advantages.

Figure 4:
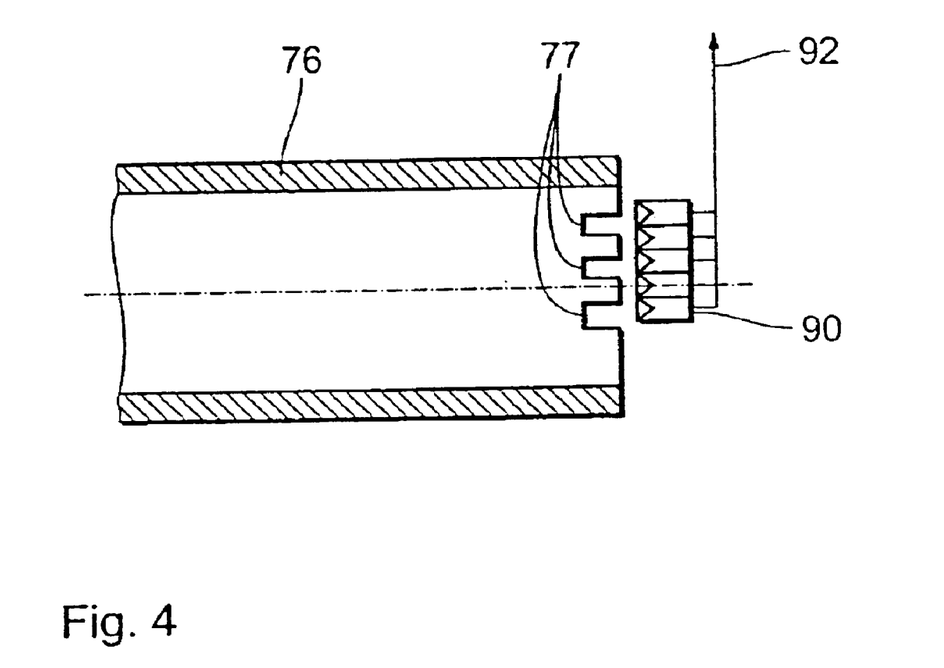

With the first embodiment shown in FIG. 3a, means of this type can also be provided on the tube 76 to detect whether the tube 76 has been inserted and, if necessary, which tube and which diffractive optical element is used at the moment, provided corresponding coding options exist. Such an option is presented as an example in FIG. 4, where the machine-side end of the tube 76 is provided with recesses 77 that form a coding. A group of initiators 90, arranged on the machine (not shown herein), registers the existence or lack of recesses 77. As a result, the binary coding is detected and is transmitted as a signal via a control line 92 to a machine control that is not shown in the Figures.

Figure 5A:
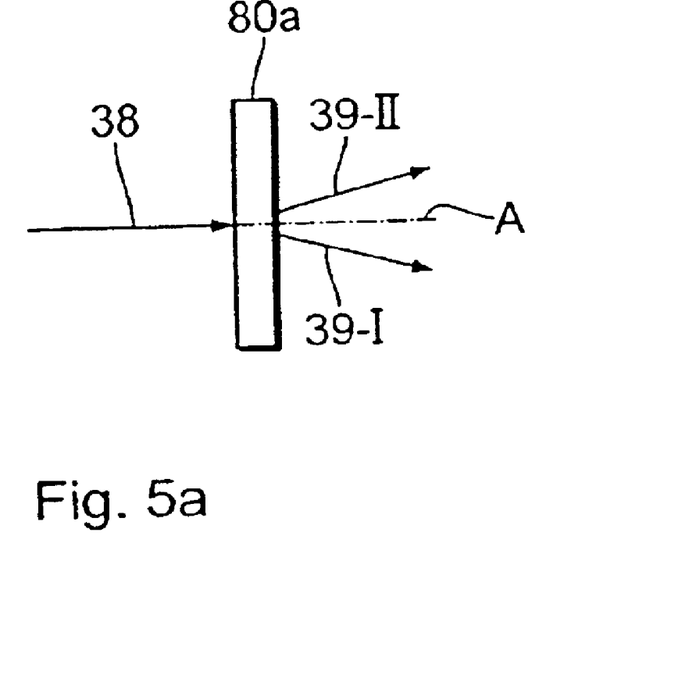
Figure 5B:
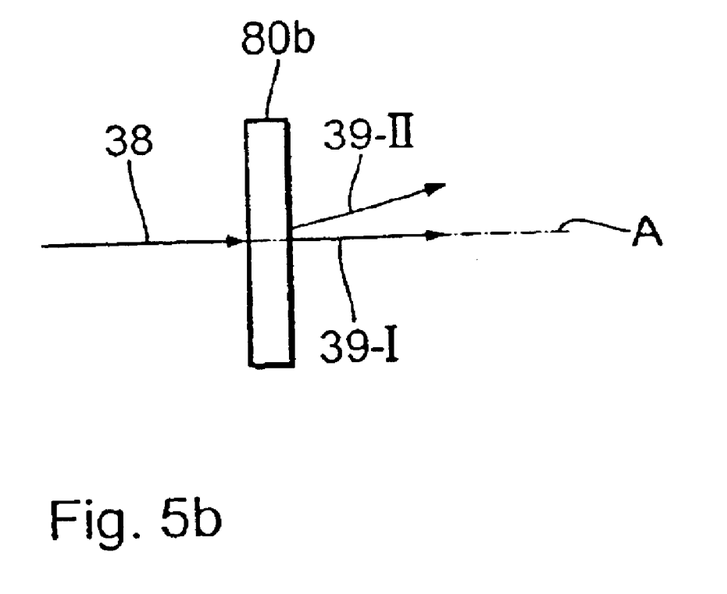

Two embodiments of a diffractive optical element are shown as examples in, respectively, FIGS. 5a and 5b, in a schematic cross-section.

With the first embodiment 80a shown in FIG. 5a, the impinging beam 38 is divided into two partial beams 39-I and 39-II, which extend angle-symmetrical to the impinging beam 38. Accordingly, the two partial beams 39-I and 39-II diverge at approximately the same angle to the axis A. The two partial beams 39-I and 39-II of this embodiment are diffracted in the same way, but in different directions.

In the second embodiment 80b, on the other hand, the two partial beams 39-I and 39-II, formed from the impinging beam 38, extend non-symmetrical to the axis A of the impinging beam 38. The first partial beam 39-I does not experience diffraction, but exits the diffractive optical element 80b in the same direction from which the impinging beam 38 enters the diffractive optical element 80b. The axis A of the first partial beam 39-I thus coincides with the axis of the impinging beam 38. In this second embodiment 80b of the diffractive optical element only the second partial beam 39-II is diffracted, which exits at an angle to the axis A. The first partial beam 39-I can thus also be called a beam of zero diffractive order and the diverging second partial beam 39-II can be called a beam of the first diffractive order. The second embodiment 80b in particular has the advantage that the stray beam appearing along the axis A, which is normally not desirable but is unavoidable, is now used to generate the first partial beam 39-I. The diffractive optical element 80b should therefore be designed such that an additional partial beam, which is mirror-symmetrical to the second partial beam 39-II relative to the axis A and is a partial beam of the −1 diffractive order, is essentially suppressed and does not make an appearance.

The angle between the diverging partial beams normally is in the range of approximately 1 to 2°.

As an alternative to the previously described exemplary embodiments according to FIGS. 3a and 3b, the diffractive optical element 80 can, for example, also be integrated into the beam divider 44. This has advantages with respect to space, but does not permit an easy replacement.

Figures 6, 6A:
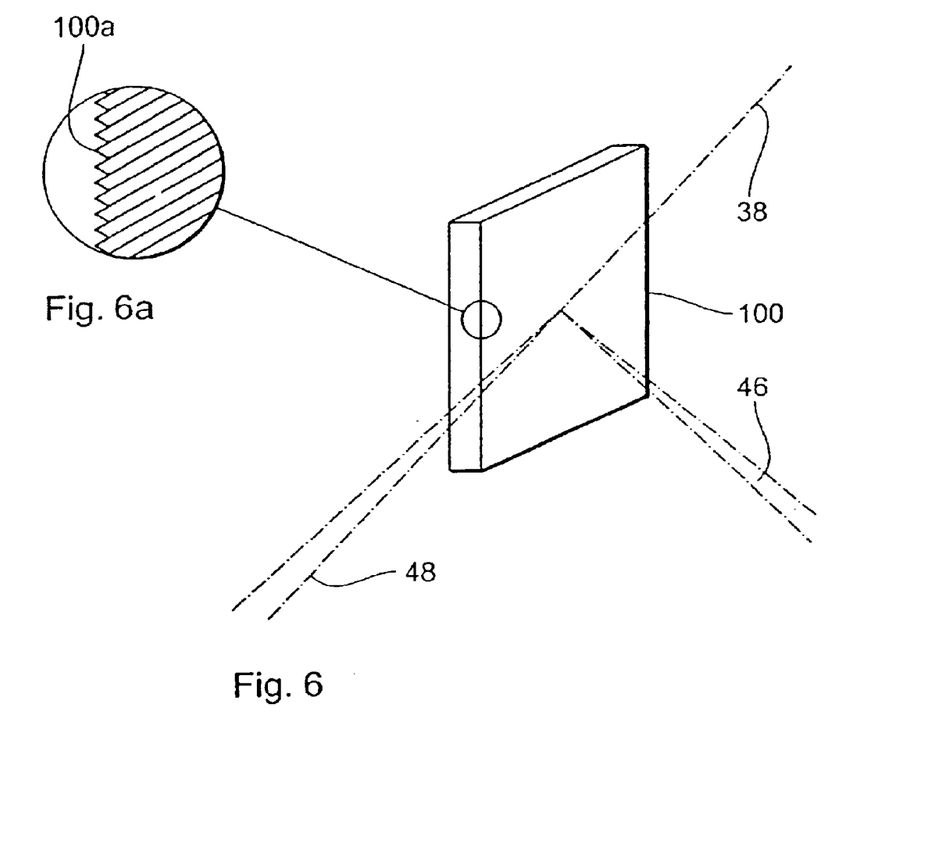

An integrated optical component can also be provided for this, which combines the function of beam divider and diffractive optical element. An integrated optical component 100 of this type is shown schematically in FIG. 6. For the embodiment shown in FIG. 6a, the surface 100a of this integrated optical component 100 has a grid-type structure, which not only divides the beam 38 generated by the radiation source into a reflected first partial beam 46 and a transmitted second partial beam 48, but at the same time also divides the reflected first partial beam 46 and the transmitted second partial beam 48 into a double or multiple beam, as shown schematically in FIG. 6.

It will be understood that the above description of the present invention is susceptible to various modifications, changes and adaptations, and the same are intended to be comprehended within the meaning and range of equivalents of the appended claims.

What is claimed is:

1. A device for producing zones of desired air permeability in the enveloping material of rod-shaped articles, comprising:
   a beam-guiding device for focusing a multiple beam generated from a single energy-rich beam originating from a radiation source onto the enveloping material in order to create perforation zones; and
   a multiple beam-generating device located for creating a multiple beam from the single energy-rich beam, the multiple beam-generating device comprising at least one optical element that is fixed relative to the single energy-rich beam in an operating position of the optical element.

2. A device according to claim 1, wherein the optical element comprises a diffractive optical element.

3. A device according to claim 1, wherein the optical element comprises an optical grid.

4. A device according to claim 1, wherein the optical element generates a multiple beam with an even number of partial beams diverging at an angle to each other and wherein a first partial beam of the multiple beam exits in the direction of or along the axis of the beam entering the optical element and at least one additional partial beam of the multiple beam exits from the optical element at an angle to the direction or axis of the beam entering the optical element.

5. A device according to claim 4, wherein the optical element generates a multiple beam with two partial beams diverging at an angle to each other, and wherein the first partial beam of the multiple beam exits the optical element in the direction of or along the axis of the beam entering the optical element and the second partial beam of the multiple beam exits the optical element at an angle to the direction or axis of the beam entering the optical element.

6. A device according to claim 5, wherein the optical element is designed so that an additional partial beam that is mirror-symmetrical to the second partial beam, relative to the axis, is essentially suppressed.

7. A device according to claim 1, wherein the optical element is arranged for moving in and out of the beam path.

8. A device according to claim 7, wherein the optical element is arranged for pivoting out of the beam path.

9. A device according to claim 1, wherein the optical element is arranged such that it can be replaced.

10. A device according to claim 1, further comprising a housing that accommodates the beam-guiding device and a holding element for holding the optical element on or in the housing.

11. A device according to claim 10, wherein the optical element is attached to the holding element.

12. A device according to claim 10, wherein the holding element is fastened detachable to or inside the housing.

13. A device according to claim 10, wherein the holding element is movably arranged inside the housing and is pre-stressed by a spring in a direction away from the housing.

14. A device according to claim 10, and further comprising means for detecting the presence of at least one of the housing and the holding element when the device is arranged on a machine for producing the rod-shaped articles.

15. A device according to claim 10, wherein the holding element is a tube through which the radiation is guided and the optical element is installed at an end of the tube facing the beam-guiding device.

16. A device according to claim 15, wherein the tube is insertable into the housing.

17. A device according to claim 1, wherein the beam-guiding device includes optical focussing means for generating converging beams and focussing the beams onto the perforation zones on the enveloping material.

18. A device according to claim 1, wherein the multiple beam-generating device forms a multiple beam from the beam emitted by the radiation source and further including a beam-divider for dividing the multiple beam into at least two partial beams, the beam-guiding device focussing the partial beams from the beam-dividing arrangement onto the enveloping material in order to form a number of perforation zones that correspond to the number of partial beams, the multiple beam-generating device comprising a single optical element that is fixedly positioned in an operating position relative to the beam from the radiation source.

19. A device according to claim 18, wherein the beam-dividing arrangement comprises a beam divider and the optical element is integrated into the beam divider.

20. A device according to claim 19, wherein the beam divider simultaneously functions as the optical element.

21. A device according to claim 18, wherein the beam divider divides the beam generated by the radiation source into at least two partial beams in which each partial beam is in the form of a multiple beam.

22. A device according to claim 18, further comprising a beam dividing optical component in which an incident beam is partially reflected as a first partial beam and partially transmitted as a second partial beam, wherein the said component includes means for forming each of the first and second partial beams as a multiple partial beam.

23. The beam divider according to claim 22, wherein the forming means comprises an optical element integrated into said component.

24. A device according to claim 1, further including a beam-dividing arrangement for dividing the energy-rich beam generated by the radiation source into at least two partial beams; wherein the beam-guiding device focuses the partial beams onto the enveloping material in order to create a number of perforation zones that correspond to the number of partial beams and the multiple beam-generating device has an optical element for each partial beam, which optical element is fixed in its operating position, relative to the respective partial beam, for forming a multiple beam from each partial beam.

25. A beam divider, comprising:
a beam dividing optical component in which a beam incident on said component is partially reflected as a first partial beam and partially transmitted as a second partial beam, wherein the said component includes means for forming each of the first and second partial beams as a multiple partial beam,
wherein the forming means comprises an optical element integrated into said component, and wherein the optical element comprises a grid structure which divides the incident beam into the first and second partial beams and at the same time divides each of the first and second partial beams into a multiple beam.

26. The beam divider according to claim 25, wherein the optical element comprises a grid structure which divides the incident beam into the first and second partial beams and at the same time divides each of the first and second partial beams into a multiple beam.

* * * * *